(12) United States Patent
Lecole et al.

(10) Patent No.: US 8,175,791 B2
(45) Date of Patent: May 8, 2012

(54) AUTOMATIC VEHICLE START/STOP CONTROL METHOD

(75) Inventors: Brice Lecole, Paris (FR); Magali Laurence, Paris (FR)

(73) Assignee: Valeo Equipements Electriques Moteur, Creteil (FR)

( * ) Notice: Subject to any disclaimer, the term of this patent is extended or adjusted under 35 U.S.C. 154(b) by 777 days.

(21) Appl. No.: 11/575,771

(22) PCT Filed: Sep. 22, 2005

(86) PCT No.: PCT/FR2005/002354
§ 371 (c)(1),
(2), (4) Date: May 5, 2009

(87) PCT Pub. No.: WO2006/032794
PCT Pub. Date: Mar. 30, 2006

(65) Prior Publication Data
US 2009/0216430 A1    Aug. 27, 2009

(30) Foreign Application Priority Data

Sep. 23, 2004    (FR) ..................................... 04 10095

(51) Int. Cl.
*F02D 45/00*    (2006.01)
*F02D 29/02*    (2006.01)
*G06F 19/00*    (2011.01)
(52) U.S. Cl. ....................................................... 701/112
(58) Field of Classification Search .................. 701/112, 701/113, 102, 115, 48, 53, 54; 123/198 F, 123/198 D, 179.3, 179.12
See application file for complete search history.

(56) References Cited

U.S. PATENT DOCUMENTS

| 6,752,741 | B2 | 6/2004 | Kahlon et al. |
| 6,817,329 | B2 | 11/2004 | Buglione et al. |
| 6,913,558 | B2 | 7/2005 | Mori et al. |
| 7,037,234 | B2 | 5/2006 | Kahlon et al. |
| 7,212,910 | B2 * | 5/2007 | Akasaka ........................ 701/112 |
| 7,337,056 | B2 * | 2/2008 | Arai ................................ 701/96 |
| 7,474,012 | B2 * | 1/2009 | Tabata et al. ............. 180/65.235 |
| 7,532,973 | B2 * | 5/2009 | Akasaka ........................ 701/112 |
| 8,007,402 | B2 * | 8/2011 | Tabata et al. ....................... 477/3 |
| 2003/0150417 | A1 | 8/2003 | Miwa |
| 2003/0224902 | A1 | 12/2003 | Kahlon et al. |
| 2004/0029677 | A1 | 2/2004 | Mori et al. |
| 2004/0089258 | A1 | 5/2004 | Buglione et al. |
| 2004/0127327 | A1 | 7/2004 | Kahlon et al. |
| 2010/0094512 | A1 * | 4/2010 | Corniglion et al. ............. 701/48 |

FOREIGN PATENT DOCUMENTS

DE    10211461 C1    7/2003

(Continued)

*Primary Examiner* — Hieu T Vo
(74) *Attorney, Agent, or Firm* — Jacox, Meckstroth & Jenkins

(57) ABSTRACT

A method of managing the degraded modes of a system for the automatic starting/stopping of a heat engine of a vehicle, whereby the system receives information supplied by measurement and detection sensors and by a bus for the communication of vehicle operating data. The method comprises the following steps consisting in verifying the presence and validity of the information supplied by the sensors and, in the event of a negative result, defining a first degraded mode in which any stopping phase of the automatic start/stop mode is forbidden until an end-of-restriction condition has been fulfilled, and, in the even of a positive result, testing the communication with the data communication bus and, in the event of a negative result, defining a second degraded mode in which the automatic start/stop mode is inhibited until an end-of-inhibition condition has been fulfilled.

14 Claims, 2 Drawing Sheets

FOREIGN PATENT DOCUMENTS

| | | |
|---|---|---|
| DE | 10211463 B3 | 1/2004 |
| EP | 1333174 A1 | 8/2003 |
| FR | 2688548 A1 | 9/1993 |
| JP | 58023254 A | 2/1983 |

* cited by examiner

AUTOMATIC VEHICLE START/STOP CONTROL METHOD

BACKGROUND OF THE INVENTION

1. Field of the Invention

The present invention concerns a method of controlling a command for the automatic starting/stopping of the thermal engine of a vehicle, the command using information coming from sensors and a data communication bus, the information representing an operating state of the vehicle, as well as a device for controlling the implementation of the method.

Automatic starting/stopping control is known by the English term "Stop and Go".

2. Description of the Related Art

The control of the automatic starting/stopping of a vehicle consists, under certain conditions, of causing the complete stoppage of the thermal engine when the vehicle is itself at rest, and then restarting the thermal engine following, for example, an action by the driver interpreted as a restarting request. A typical situation of "Stop and Go" is that of stopping at a red light. When the vehicle stops at the light, the thermal engine is automatically stopped and then, when the light goes green, the engine is restarted following the detection of the pressing of the clutch pedal by the driver or any other action that can be interpreted as the intention of the driver to restart his vehicle. The advantage of the "Stop and Go" control in terms of energy saving and reduction in pollution, in particular in an urban environment, will be understood.

"Stop and Go" control uses information representing an operating state of the vehicle, information coming from sensors in the vehicle, such as sensors for the cabin temperature or for detecting the position of the clutch pedal, or information read on a data communication bus such as the speed of the vehicle or the speed of rotation of the engine.

Although this control makes it possible to stop and restart the thermal engine automatically, there do not currently exist any particular technical arrangements for taking account of conditions disturbing the normal functioning of the automatic vehicle starting/stopping control.

SUMMARY OF THE INVENTION

Thus one technical problem to be resolved by the object of the present invention is to propose a method of controlling a command for the automatic starting/stopping of the thermal engine of a vehicle, the command using information coming from sensors and a data communication bus, the information representing an operating state of the vehicle, as well as an associated control device, which make it possible to define the steps to be taken when circumstances arise in which the automatic vehicle starting/stopping command can no longer function satisfactorily.

One solution to the technical problem posed consists, according to a first object of the present invention, of the control method comprising the steps of:

testing the presence and validity of information supplied by the sensors and, in the case of a negative test, defining a first degraded mode of the automatic starting/stopping command, testing the communication with the data communication bus and, in the case of a negative test, defining a second degraded mode of the automatic starting/stopping command.

Thus, in the absence of information coming from the sensors, or if this information proves to be erroneous, inconsistent or implausible, the automatic starting/stopping system goes into the first degraded mode.

According to the invention, the first degraded mode prevents the stopping of the thermal engine but allows restarting if the restarting conditions for it are satisfactory. Stopping is prevented until an end of prevention condition is fulfilled.

On the other hand, if no communication can be established with the communication bus, the second degraded mode is passed to. This second degraded mode that results from this has more serious consequences since, in this case, according to the invention, the automatic starting/stopping command is completely inhibited until an end of inhibition is achieved.

According to the invention, when the information supplied by the sensors is once again available, the prevention is terminated. Just as, when communication with the data communication bus is re-established, the inhibition is terminated.

Provision can also be made, according to the invention, for the end of prevention condition or the end of inhibition condition to be the cutting off of the power supply to an on-board system of the vehicle, for example by means of a vehicle ignition key. In this case, in fact, everything is re-initialised, and the vehicle is therefore ready to function once again under nominal initial conditions, as is the automatic starting/stopping control.

The invention also proposes that, in the second degraded mode, a reversible rotary electrical machine coupled to the thermal engine of the vehicle is configured in alternator mode, the machine being intended to start the thermal engine of the vehicle automatically. This provision stems from the fact that, when the vehicle is equipped with such a machine, an alternator/starter for example, the inhibition of the automatic starting/stopping control prevents the reversible rotary electrical machine from functioning in starter mode, only alternator mode being enabled.

In addition, it may be advantageous to inform the driver of the change to a degraded mode. Thus, according to the invention, a warning signal of going into a degraded mode is activated.

Finally, according to a non-limiting embodiment, the sensors are tested only in the event of a positive test on the communication bus.

According to a second object of the invention, the invention proposes a device for controlling an automatic starting/stopping command for the thermal engine of a vehicle, comprising:

first means for testing the presence and validity of information supplied by the sensors, and, in the case of a negative test, defining a first degraded mode of the automatic starting/stopping command, second means for testing the communication with the data communication bus and, in the case of a negative test, defining a second degraded mode of the automatic starting/stopping command.

According to a third object of the invention, the invention proposes a reversible rotary electrical machine comprising a device for controlling the implementation of the method according to any one of the above characteristics.

The description that follows with regard to the accompanying drawings, given by way of non-limiting examples, will give a clear understanding of what the invention consists and how it can be implemented.

Other objects and advantages of the invention will be apparent from the following description, the accompanying drawings and the appended claims.

DETAILED DESCRIPTION OF THE PREFERRED EMBODIMENTS

Figure 1:
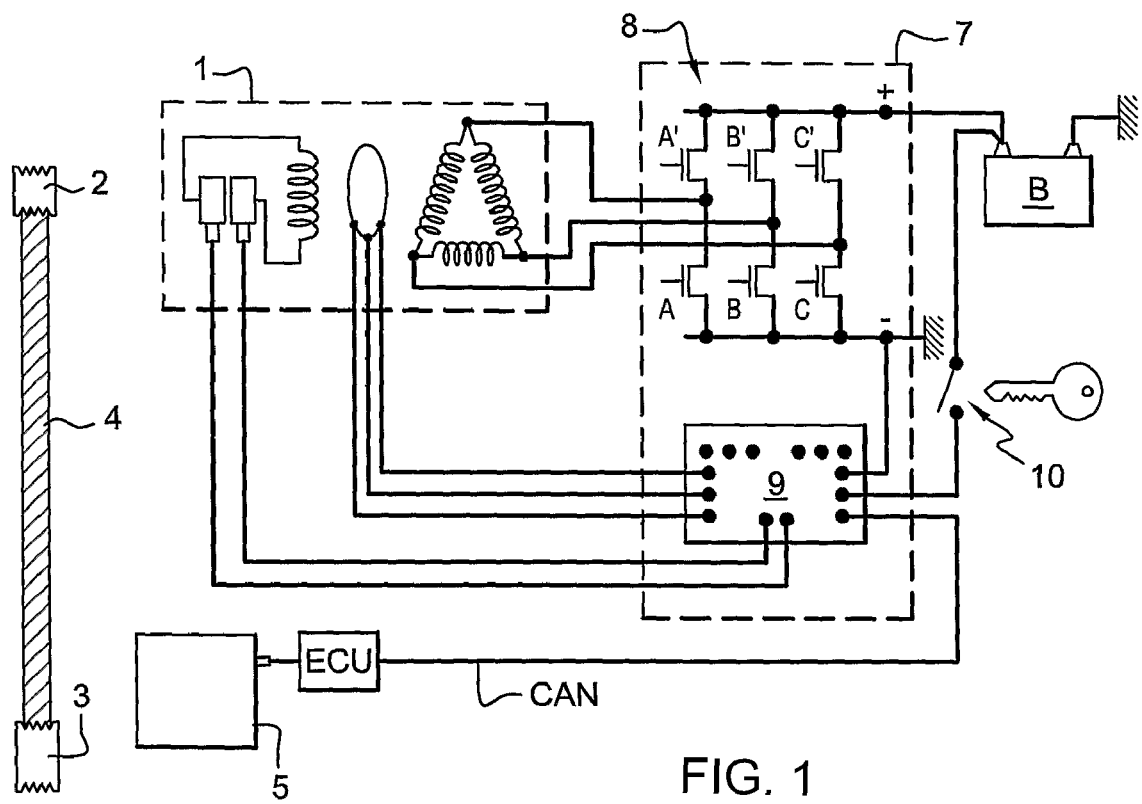
FIG. 1 is a diagram illustrating a motor vehicle in which the control method according to the invention is implemented.

FIG. 1 depicts a motor vehicle comprising:
- a thermal engine 5 comprising a control unit called an engine control ECU, the unit being also able to be independent of the thermal engine. The engine control ECU supplies in particular the motor speed, the vehicle speed and the temperature of the thermal engine,
- a separate rotary electrical machine 1. In the remainder of the description, an alternator/starter is taken as a non-limiting example of a rotary electrical machine. A conventional starter can also be taken as an example. Such an alternator/starter comprises a rotor and a stator, a shaft terminating in a pulley 2 that is connected to a pulley 3 of the crankshaft of the thermal engine by means of a belt 4. This alternator/starter is mounted in the place that the alternator normally occupies. In general terms, a reversible electrical machine such as an alternator/starter combines two distinct functions, namely on the one hand a conventional alternator function when the shaft of the thermal engine drives the rotor of the machine so as to produce an electric current at the stator and, on the other hand, the starter function when conversely a current applied to the stator of the machine causes the rotor to be set in rotation, which then drives the shaft of the thermal engine in a similar manner to a conventional starter,
- control electronics 7 for the alternator/starter.

The control electronics 7 comprises:
- a transistor bridge 8 that constitutes a reversible power converter and that provides control in starter mode and synchronous rectification in alternator mode;
- a management module 9 that controls the various transistors of the converter 8 and in particular manages the following various functions:
- power in starter and alternator modes
- regulation in alternator mode
- transition from starter mode to alternator mode.

The management module 9 is for this purpose supplied by the voltage of the battery, referenced B, to which it is connected by means of an ignition switch 10 of the vehicle. The management module 9 communicates with the engine control ECU through a CAN communication bus, the bus making it possible to send back information such as in particular the speed of the thermal engine.

It should be noted that, according to a non-limiting preferential embodiment, the starting/stopping strategy, also referred to as "Stop and Go" strategy, determined by the starting/stopping command, is downloaded into a flash or EEPROM memory of a control device such as a microcontroller of the management module 9 of the alternator/starter.

According to another non-limiting embodiment, this strategy can also be downloaded into a memory of a control device included in the ECU engine control.

The management module 9 that thus generates, in the example taken, the "Stop and Go" strategy receives information representing an operating state of the vehicle, the information coming from:
- measurement and detection sensors distributed in the vehicle, such as temperature measurement sensors (cabin, electronic circuits, etc) and sensors for detecting the position of various components (clutch pedal, brake pedal, gear lever, etc), and
- the CAN communication bus of the vehicle, such as the speed of the vehicle, the speed of the thermal engine, the thermal temperature of the engine, etc.

This information must obviously be perfectly known for suitable implementation of the automatic starting/stopping command.

It is precisely when an incident occurs in the transmission of this information to the management module 9 that the automatic starting/stopping command switches into degraded modes whose management is provided by the control method.

In a preferential embodiment, two degraded modes are envisaged.

The first degraded mode is activated if one of the items of information supplied by the sensors is lost, for example the position of the clutch pedal, the cabin temperature, etc. Loss of information means the complete absence of a signal coming from the sensors or values that cannot be validated since they are considered to be inconsistent or implausible. Thus, the control device of the management module 9 no longer receives any information from the sensors, or it is not validated.

The second degraded mode is activated if communication on the CAN bus is lost, namely that the control device then no longer receives any information via the CAN communication bus, in particular from the ECU engine control, such as the speed of the vehicle and engine etc. The management module 9 no longer receives any information from the CAN communication bus.

Figure 2A:
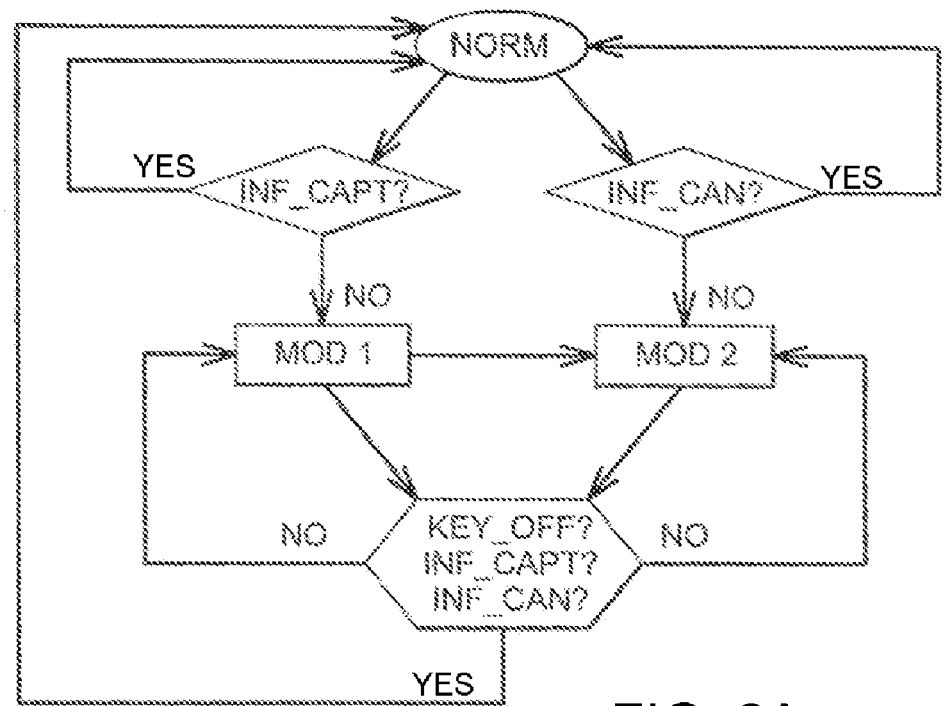
FIGS. 2A and 2B are diagrams illustrating the functioning of the control method according to non-limiting embodiments of the invention.
Figure 2B:
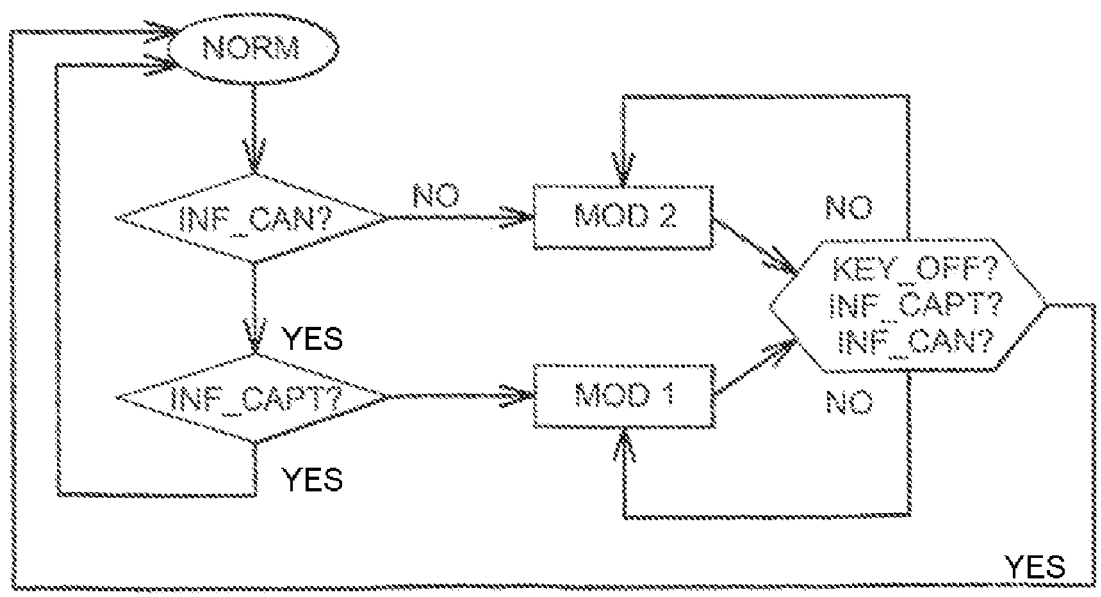

These degraded modes are then managed in accordance with the control method present on the diagrams of FIGS. 2A and 2B according to non-limiting embodiments.

In normal functioning NORM, that is to say when the starting/stopping control is functioning in nominal fashion, in a first step 1), the presence and then the validity of the information INF_CAPT supplied by the sensors CAPT are tested continuously. It should be noted that the CAN communication bus makes it possible to have information on the functioning of the sensors. Thus, if a sensor CAPT is no longer functioning, there will be information in this regard via the CAN bus.

If sensor information is present, its validity is tested. For example, if there is a sensor CAPT that gives the position of the clutch pedal as a function of values that must be between 1 and 4V corresponding to the percentage of pressing on the pedal, and the sensor information that is received is 10V, this information is not valid.

In a first substep 1a), in the case of a positive test, the starting/stopping control continues to function in nominal mode NORM, namely it sends a stop order to the ECU engine control of the thermal engine 5 for automatic stopping and sends a start instruction to the rotary electrical machine for automatic starting of the engine 5.

In a second substep 2a), on the other hand, in the case of a negative test (at least one item of sensor information is not present or valid), the first degraded mode MOD1 is passed to, according to which part of the "Stop and Go" strategy of the starting/stopping control is kept but any automatic stopping of the starting/stopping control is prevented. It is no longer possible to send an automatic stop instruction to the ECU engine control of the thermal engine in order to stop the engine.

However, it is always possible to send a start instruction to the rotary electrical machine, here the alternator/starter, in order to start the thermal engine automatically. This is because this is particularly advantageous if the first degraded mode occurs when the thermal engine has been stopped automatically. At this moment, automatic restarting in enabled.

In normal operation, in a second step 2), a communication with the CAN bus is tested continuously.

In a first substep 2a), if this test is positive, that is to say if communication with the CAN bus is not lost, the control continues to function in nominal mode.

In a second substep 2b), on the other hand, if conversely communication with the CAN bus is lost, that is to say the information INF_CAN supplied by the said bus is no longer received, the second degraded mode MOD2 is passed to, according to which the starting/stopping control is then inhibited: it is no longer possible to send a stop instruction to the ECU engine control of the thermal engine in order to stop the said engine automatically, nor to send a start instruction to the rotary electrical machine, here the alternator/starter, in order to start the thermal engine automatically. Only starting by means of an additional conventional starter is enabled, if available.

Another consequence of going into the second degraded mode is that, in a preferential embodiment, the alternator/starter is configured in simple alternator mode, the alternator/starter no longer being able to serve to start the engine automatically.

In a first embodiment illustrated in FIG. 2a, the first and second steps are performed simultaneously and, if the two steps have a negative test as a result, the second degraded mode MOD2 prevails over the first degraded mode MOD1.

In a second embodiment illustrated in FIG. 2b, the first step is performed only in the case of a positive test at the second step, that is to say the sensors are tested only after a positive test on the communication bus.

In a third embodiment, if the first degraded mode MOD1 applies and communication on the bus is lost, the second degraded mode MOD2 is passed to.

Finally, in a preferential embodiment, a warning signal is activated in order to inform the driver that the automatic starting/stopping control is being executed according to a degraded mode. The signal is preferably an indicator light for warning of change to either of the degraded modes.

As indicated in FIGS. 2A and 2B, the starting/stopping control regains normal operation as soon as the missing information is recovered, that is to say:

in the case of a positive test on the presence and validity of the information INF_CAPT supplied by the sensors, ie when the sensor information INF_CAPT is once again available, or in the case of a positive test on communication with the CAN bus, ie when communication is re-established, or if the power supply to the on-board system of the vehicle is cut off, ie the vehicle ignition key is in the inactive position KEY_OFF thus permitting reinitialization of all the vehicle system, the system comprising the sensors, the CAN communication bus, etc.

Naturally the invention is not limited to its degraded modes and can apply to any other degraded mode in which for example automatic restarting is inhibited.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A device for controlling an automatic starting/stopping command for a thermal engine of a vehicle, said command using information coming from a plurality of sensors and a data communication bus, said information representing an operating state of the vehicle, said device further comprising:

first means for testing a presence and validity of information supplied by said sensors and, in the case of a negative test, defining a first degraded mode of the automatic starting/stopping command; and second means for testing the communication with the data communication bus and, in the case of a negative test, defining a second degraded mode of the automatic starting/stopping command.

2. The control device according to claim 1, wherein, in the first degraded mode, any automatic stopping is prevented until an end of prevention condition is fulfilled.

3. The control device according to claim 1, wherein, in the second degrade mode, said automatic starting/stopping command is inhibited until an end of inhibition condition is fulfilled.

4. A method of controlling an automatic starting/stopping command for a thermal engine of a vehicle, said automatic starting/stopping command using information coming from sensors and a data communication bus, said information representing an operating state of the vehicle, wherein said method further comprises the steps of:

testing the presence and validity of said information supplied by said sensors and, in the case of a negative test, defining a first degraded mode of the automatic starting/stopping command; and testing the communication with the data communication bus and, in the case of a negative test, defining a second degraded mode of the automatic starting/stopping command.

5. The control method according to claim 4, wherein, in the first degraded mode, any automatic stopping is prevented until an end of a prevention condition is fulfilled.

6. The control method according to claim 5, wherein, when the information supplied by said sensors is once again available, said prevention is terminated.

7. The control method according to claim 5, wherein in that said end of said prevention condition is a cutting off of the power supply to the on-board system of the vehicle.

8. The control method according to claim 4 wherein, in the second degrade mode, said automatic starting/stopping command is inhibited until an end of inhibition condition is fulfilled.

9. The control method according to claim 8, wherein, when communication with the data communication bus is re-established, said inhibition is ended.

10. The control method according to claim 8, wherein said end of inhibition condition is a cutting off of the power supply to an on-board system of the vehicle.

11. The control method according to claim 4, wherein, in the second degraded mode, a reversible rotary electrical machine coupled to said thermal engine of the vehicle is configured in alternator mode, said machine being intended to start the thermal engine of the vehicle automatically.

12. The control method according to claim 4, wherein a warning signal for passage to a degraded mode is activated.

13. The control method according to claim 4, wherein the test on the sensors is performed in the event of a positive test on the data communication bus.

14. A reversible rotary electrical machine comprising a control device for implementing the method according to claim 4.

* * * * *